(12) United States Patent
Hatta et al.

(10) Patent No.: US 11,643,791 B2
(45) Date of Patent: May 9, 2023

(54) FRONT GUARD AND WORKING MACHINE

(71) Applicant: KUBOTA CORPORATION, Osaka (JP)

(72) Inventors: Kazuyuki Hatta, Sakai (JP); Taiki Fujimoto, Sakai (JP); Akira Komukai, Sakai (JP); Yoshinori Torii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 71 days.

(21) Appl. No.: 17/474,572

(22) Filed: Sep. 14, 2021

(65) Prior Publication Data

US 2021/0404144 A1 Dec. 30, 2021

Related U.S. Application Data

(63) Continuation of application No. PCT/JP2020/009997, filed on Mar. 9, 2020.

(30) Foreign Application Priority Data

Mar. 15, 2019 (JP) .............................. JP2019-048795

(51) Int. Cl.
  *B62D 33/06* (2006.01)
  *E02F 9/16* (2006.01)
  (Continued)

(52) U.S. Cl.
  CPC .............. *E02F 9/163* (2013.01); *B60J 1/2094* (2013.01); *B62D 33/0604* (2013.01);
  (Continued)

(58) Field of Classification Search
  CPC ... E02F 9/163; E02F 9/24; E02F 3/325; B60J 1/2094; B62D 33/0604; B62D 33/0617; B62D 33/06
  (Continued)

(56) References Cited

U.S. PATENT DOCUMENTS

| | | | |
|---|---|---|---|
| 7,131,686 B1 * | 11/2006 | Jo ....................... | B62D 33/0617 280/756 |
| 2014/0175834 A1 * | 6/2014 | Karami .................. | B60S 1/566 296/190.03 |

(Continued)

FOREIGN PATENT DOCUMENTS

| | | |
|---|---|---|
| JP | 2000-23606 A | 1/2000 |
| JP | 2008-264207 A | 11/2008 |

(Continued)

OTHER PUBLICATIONS

Japanese Office Action for Japanese Application No. 2019-048795, dated Jul. 12, 2022 with a English translation.

*Primary Examiner* — Pinel E Romain
(74) *Attorney, Agent, or Firm* — Birch, Stewart, Kolasch & Birch, LLP

(57) ABSTRACT

A working machine includes a machine body an operator seat mounted on the machine body, a front working device swingable upward and downward, the front working device being provided forward of the operator seat and on one side in a machine-width direction eccentric with respect to a central portion of the operator seat, and a front guard provided forward of the operator seat. The front guard includes a first frame member provided forward of the operator seat and on the one side, and a second frame member provided forward of the operator seat and on another side opposite to the one side, the first frame member includes a main rod portion defining upper and lower portions of the first frame member, extending between the upper and lower portions of the first frame member, and provided rearward of the front working device, and the main rod portion is formed to be positioned in a machine fore-and-aft direction closer to the operator seat than the second frame member.

14 Claims, 12 Drawing Sheets

(51) Int. Cl.
*B60J 1/20* (2006.01)
*E02F 9/24* (2006.01)
*E02F 3/32* (2006.01)

(52) U.S. Cl.
CPC .......... B62D 33/0617 (2013.01); *E02F 9/24* (2013.01); *E02F 3/325* (2013.01)

(58) Field of Classification Search
USPC .................................................. 296/196.03
See application file for complete search history.

(56) References Cited

U.S. PATENT DOCUMENTS

| | | | |
|---|---|---|---|
| 2014/0292032 A1* | 10/2014 | Sasaki | E02F 9/163 296/190.03 |
| 2015/0123428 A1* | 5/2015 | Hwang | E02F 9/163 296/190.03 |
| 2016/0168823 A1 | 6/2016 | Abe et al. | |
| 2016/0168824 A1 | 6/2016 | Abe et al. | |

FOREIGN PATENT DOCUMENTS

| | | |
|---|---|---|
| JP | 5497924 B2 | 5/2014 |
| JP | 5834152 B2 | 12/2015 |
| JP | 6075358 B2 | 2/2017 |
| JP | 2017-115356 A | 6/2017 |
| WO | WO 2015/087950 A1 | 6/2015 |

* cited by examiner

Fig.9
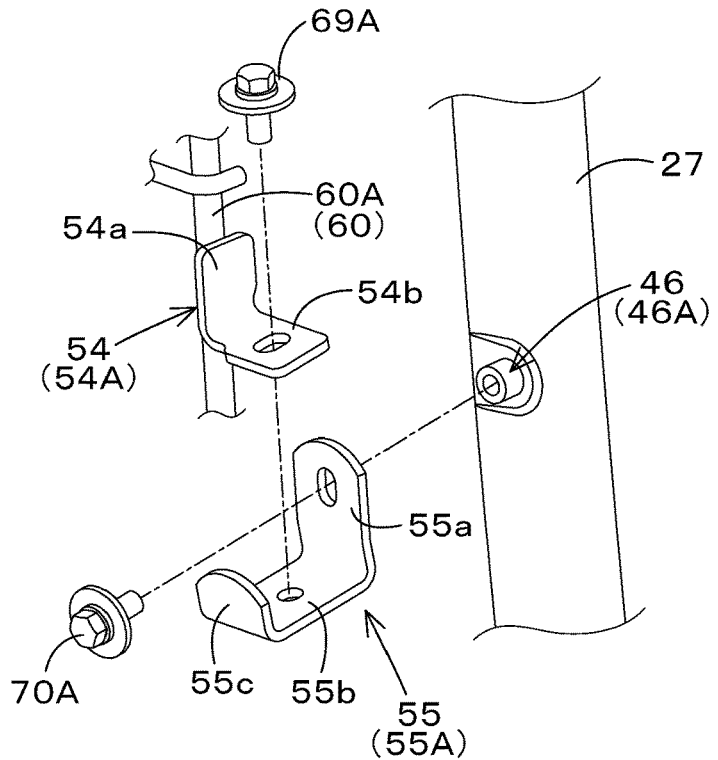
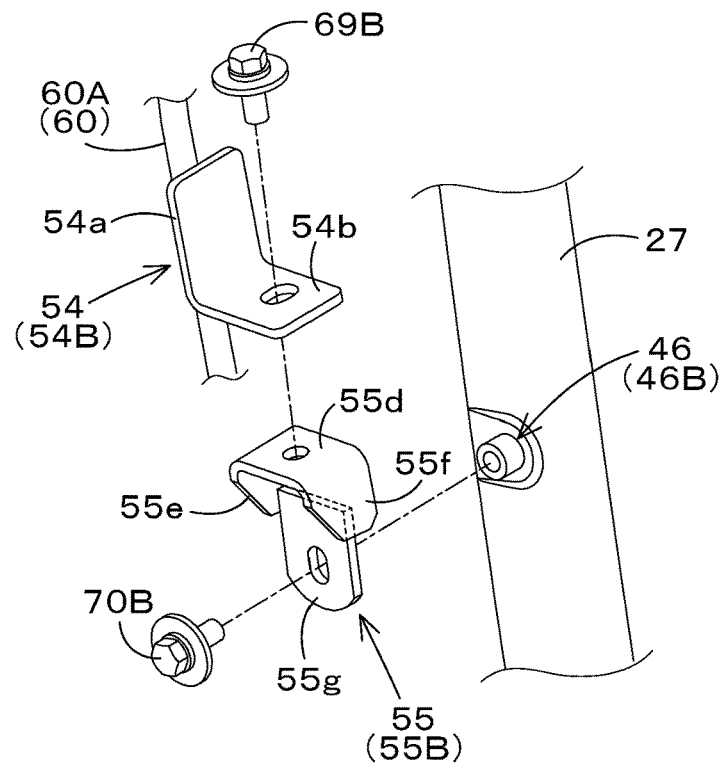

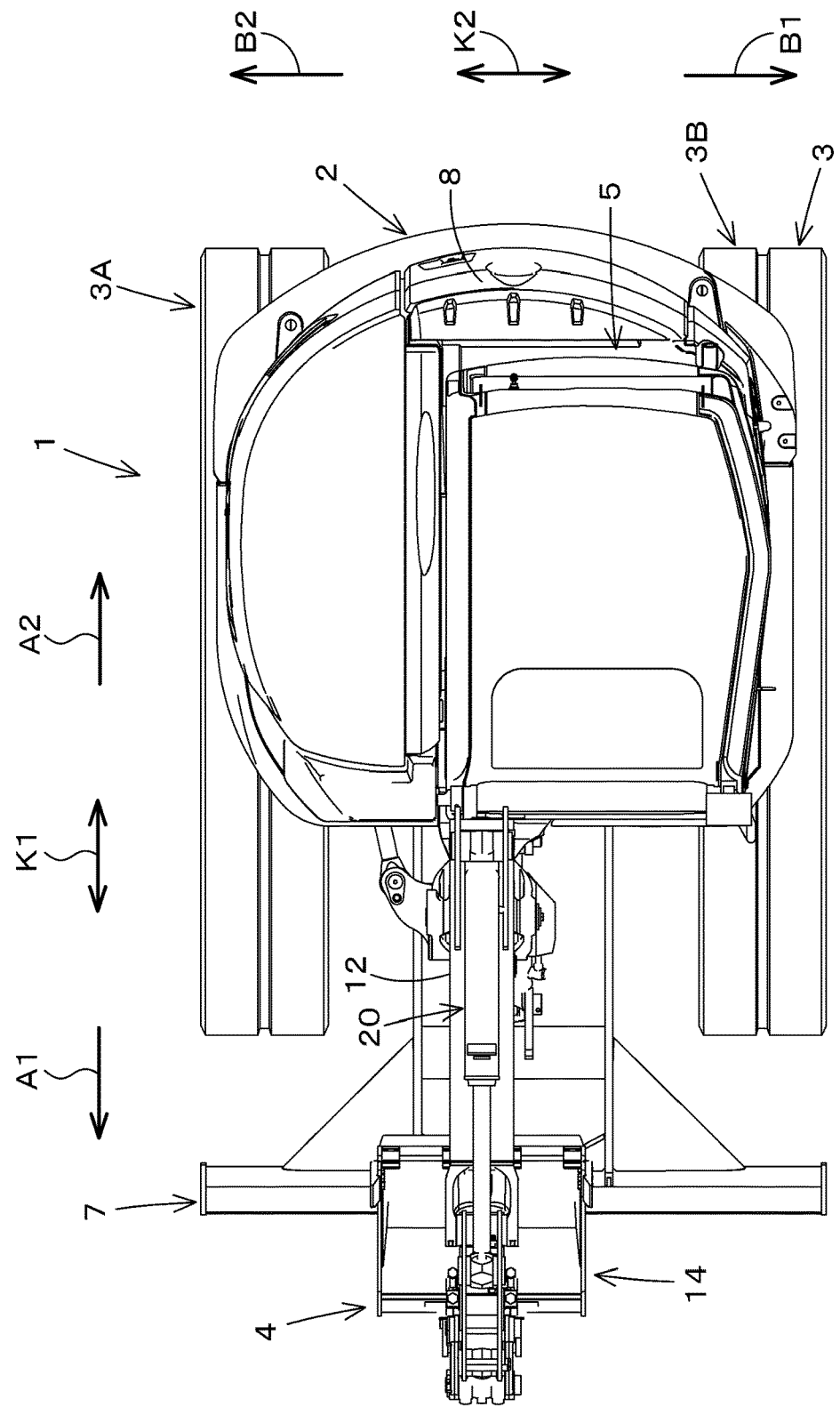

FRONT GUARD AND WORKING MACHINE

CROSS REFERENCE TO RELATED APPLICATIONS

This application is a continuation application of International Application No. PCT/JP2020/009997, filed on Mar. 9, 2020, which claims the benefit of priority to Japanese Patent Application No. 2019-048795, filed on Mar. 15, 2019. The entire contents of each of these applications are hereby incorporated herein by reference.

BACKGROUND OF THE INVENTION

Field of the Invention

The present invention relates to a front guard attached to a working machine such as a backhoe and relates to the working machine.

Description of the Related Art

A working machine disclosed in Japanese Patent Publication No. 5834152 is already known.

The working machine disclosed in Japanese Patent Publication No. 5834152 has a cabin provided with a front window on a front surface thereof and with a front guard provided in front of the front window.

SUMMARY OF THE INVENTION

In a case where the front guard is provided on the working machine in which a front working device is vertically swingably provided in front of the cabin and offsets to one side in the machine-width direction relative to the center of the cabin, the front working device may contact the one side portion of the front guard when the front working device is lifted to the uppermost position. In this case, a working range of the front working device has to be changed to prevent the front working device from contacting the front guard. This requires troublesome operations for replacing a hydraulic cylinder for vertical movement of the front working device.

In view of the above-mentioned problems, the present invention intends to prevent a front working device from interfering with a front guard that is provided in front of an operator seat.

A working machine according to one aspect of the present invention, includes a machine body, an operator seat mounted on the machine body, a front working device swingable upward and downward, the front working device being provided forward of the operator seat and on one side in a machine-width direction eccentric with respect to a central portion of the operator seat, and a front guard provided forward of the operator seat. The front guard includes a first frame member provided forward of the operator seat and on the one side, and a second frame member provided forward of the operator seat and on another side opposite to the one side. The first frame member includes a main rod portion defining upper and lower portions of the first frame member, extending between the upper and lower portions of the first frame member, and provided rearward of the front working device. The main rod portion is formed to be positioned in a machine fore-and-aft direction closer to the operator seat than the second frame member.

In addition, the working machine further includes a cabin including a front window defining a front surface of the cabin. The front guard is provided forward of the cabin. The cabin includes a first front pillar provided on one side of the front window, and a second front pillar provided on the other side of the front window. The front guard includes a first attaching stay provided on the first frame member and attached to the first front pillar, a second attaching stay provided on the second frame member and attached to the second front pillar, a third frame member joining an upper portion of the first frame member and an upper portion of the second frame member to each other, and a vibro-isolating member provided on the third frame member and pressed against an upper portion of the front window.

In addition, the working machine further includes an attachment bracket fixed to the second front pillar by bolting. The first attaching stay is formed of a single plate and includes a base portion fixed to the first frame member by welding, and a fixture portion fixed to the first front pillar by bolting. The second attaching stay is fixed to the attachment bracket by bolting.

In addition, the first attaching stay includes an intermediate portion between the base portion and the fixture portion. The intermediate portion includes a first portion extending outward in the machine-width direction from the base portion, and a second portion extending slantwise upwardly or downwardly outward in the machine-width direction from the first portion.

In addition, the front window includes a window frame defining a window opening. The third frame member is positioned to overlap an upper edge of the window opening along a visual line from an operator.

In addition, the front window includes a window frame defining a window opening, and a front surface panel covering the window opening. The front surface panel includes an upper panel openably covering an upper area of the window opening, a lower panel fixedly fitted to the window frame to cover a lower area of the window opening, and a seal portion between the upper panel and the lower panel. The front guard includes a fourth frame member joining a lower portion of the first frame member and a lower portion of the second frame member to each other. The fourth frame member is positioned to overlap the seal portion along a visual line from an operator.

In addition, the front guard includes a lattice portion between the first frame member and the second frame member. The lattice portion includes a plurality of vertical bars extending between the third frame member and the fourth frame member and aligned at intervals in the machine-width direction, and a plurality of horizontal bars crossing the vertical bars and aligned vertically at intervals. An interval between the fourth frame member and the horizontal bar neighboring to the fourth frame member is wider than an interval between the third frame member and the horizontal bar neighboring to the third frame member.

In addition, the attachment bracket includes an attachment wall fixed to the second front pillar by bolting, a placing wall extending forward from a lower portion of the attachment wall; and a retaining wall extending upward from a front portion of the attachment wall. The second attaching stay is placed on the placing wall and is fixed to the placing wall by bolting.

A front guard according to another aspect of the present invention is attached to a working machine, the working machine including a machine body, an operator seat mounted on the machine body, and a front working device swingably upward and downward, the front working device being provided forward of the operator seat and on one side in a machine-width direction eccentric with respect to a central portion of the operator seat. The front guard is provided forward of the operator seat. The front guard includes a first frame member provided at one width directional side of the front guard, and a second frame member provided at the other width directional side of the front guard. The first frame member includes a main rod portion defining upper and lower portions of the first frame member, extending between the upper and lower portions of the first frame member, and provided rearward of the front working device. The main rod portion is formed so that, in a state where the front guard is attached to the working machine, the main rod portion is positioned in a machine fore-and-aft direction closer to the operator seat than the second frame member.

In addition, the front guard further includes a first attaching stay provided on the first frame member and attached to the working machine, a second attaching stay provided on the second frame member and attached to the working machine, a third frame member joining an upper portion of the first frame member and an upper portion of the second frame member to each other, and a vibro-isolating member provided on the third frame member and pressed against a portion of the working machine.

In addition, the front guard further includes an attachment bracket fixed to the second attaching stay by bolting and fixed to the working machine by bolting. The first attaching stay is formed of a single plate and includes a base portion fixed to the first frame member by welding, and a fixture portion fixed to the working machine by bolting.

In addition, the first attaching stay includes an intermediate portion between the base portion and the fixture portion. The intermediate portion includes a first portion extending outward in the width direction from the base portion, and a second portion extending slantwise outward in the width direction from the first portion along the extension direction of the first frame member.

In addition, the front guard further includes a fourth frame member joining a lower portion of the first frame member and a lower portion of the second frame member to each other, and a lattice portion between the first frame member and the second frame member. The lattice portion includes a plurality of vertical bars extending between the third frame member and the fourth frame member and aligned at intervals in the width direction, and a plurality of horizontal bars crossing the vertical bars and aligned vertically at intervals. An interval between the fourth frame member and the horizontal bar neighboring to the fourth frame member is wider than an interval between the third frame member and the horizontal bar neighboring to the third frame member.

In addition, the attachment bracket includes an attachment wall fixed to the working machine by bolting, a placing wall extending forward from a lower portion of the attachment wall, and a retaining wall extending upward from a front portion of the placing wall. The second attaching stay is placed on the placing wall and is fixed to the placing wall by bolting.

According to the above-mentioned configuration, the main rod portion located behind the front working device can be formed closer to the operator seat than the second frame material to prevent the front working device from interfering with the main rod portion.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 9 is a perspective view showing an attachment structure of the front guard.

FIG. 12 is a plan view of the working machine.

DETAILED DESCRIPTION OF THE PREFERRED EMBODIMENTS

Figure 1:
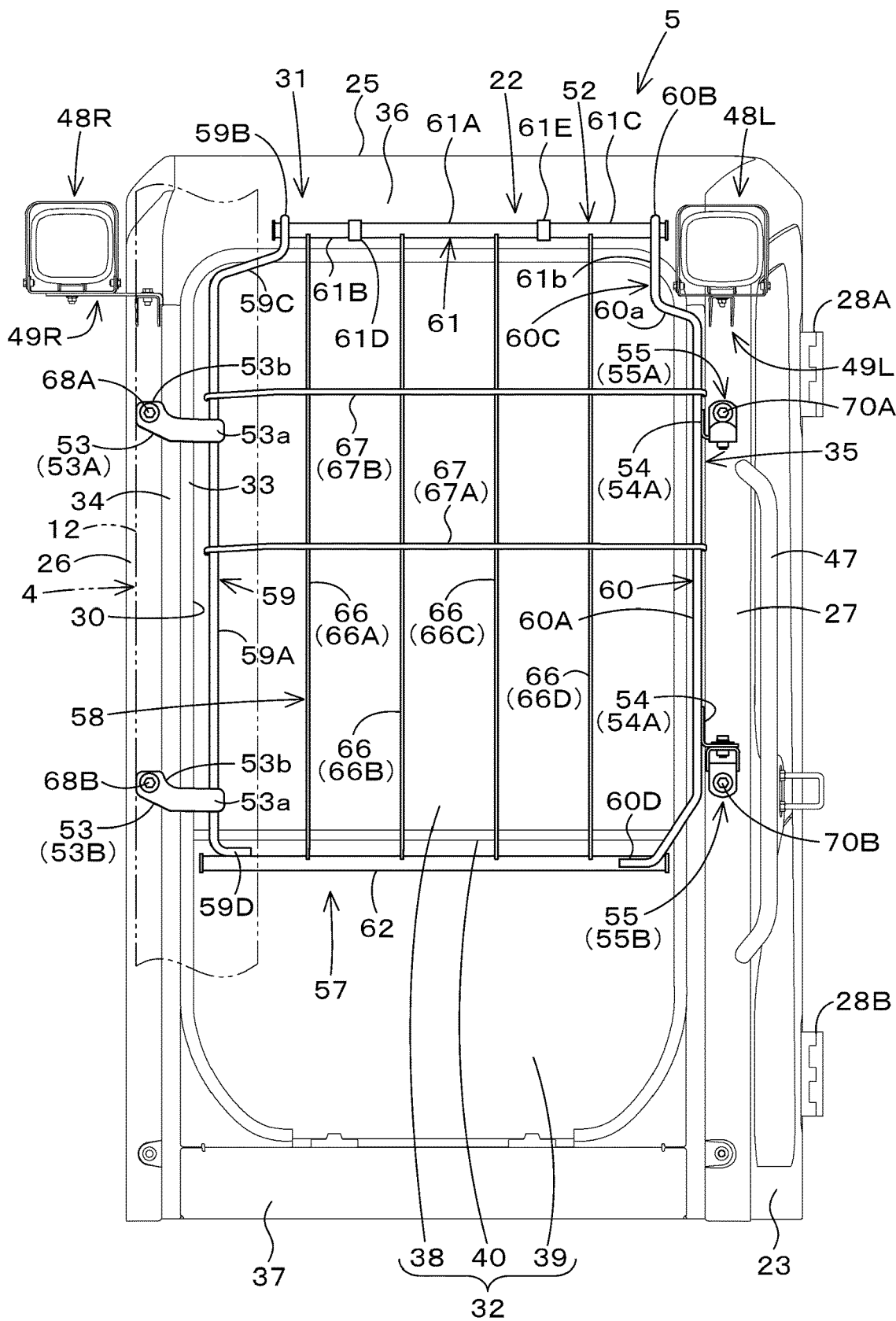
FIG. 1 is a front view of a cabin to which a front guard is attached.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, an embodiment of the present invention will be described below.

Figure 11:
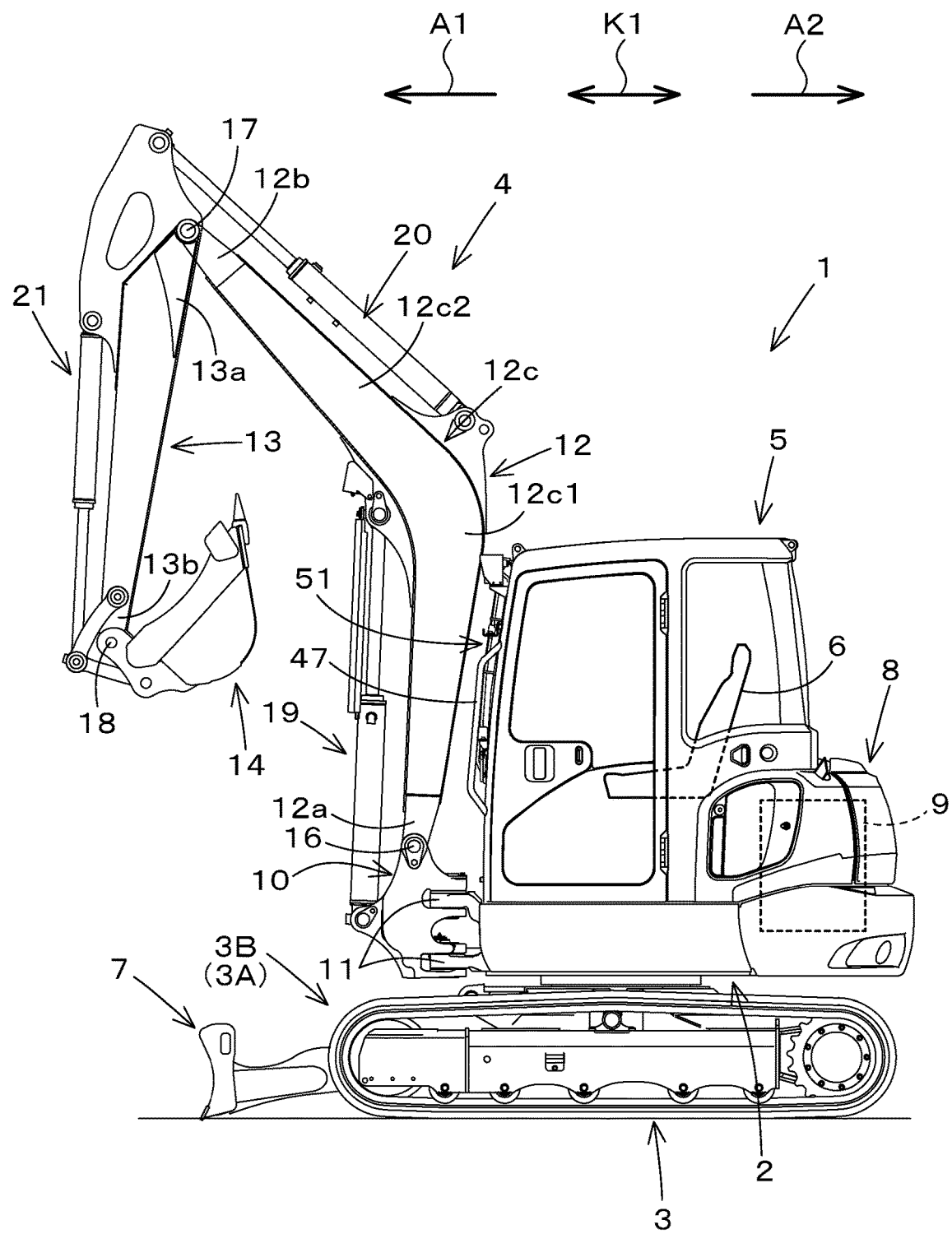
FIG. 11 is a side view of a working machine.

FIG. 11 is a schematic side view showing an overall configuration of a working machine 1 according to the present embodiment. FIG. 12 is a schematic plan view of the working machine 1. In the present embodiment, a backhoe that is a swivel working machine is shown as an example of the working machine 1.

As shown in FIGS. 11 and 12, the working machine 1 is provided with a machine body (swiveling base) 2, traveling devices 3, and a front working device 4. A cabin 5 is mounted on the machine body 2. In an interior of the cabin 5, an operator seat 6 on which an operator (that is, a driver) is seated is provided.

In explanation of the present embodiment, a forward direction of an operator seated in an operator seat 6 of the working machine 1 (a direction of an arrowed line A1 in FIGS. 11 and 12) is referred to as the front, a rearward direction of the operator (a direction of an arrowed line A2 in FIGS. 11 and 12) is referred to as the rear, a leftward direction of the operator (a front surface side of FIG. 11 and a direction of an arrowed line B1 in FIG. 12) is referred to as the left (or a machine leftward direction), and a rightward direction of the operator (a back surface side of FIG. 11 and a direction of an arrowed line B2 in FIG. 12) is referred to as the right (or a machine right direction). In addition, as shown in FIG. 12, a horizontal direction, which is orthogonal to the fore-and-aft direction (that is, the machine foreand-aft direction) K1, is described as a machine-width direction (a width direction of the machine body) K2.

Directions from the center of the machine body 2 to the left and to the right in the machine-width direction are referred to as an outward direction in the machine-width direction. In the explanation, a direction opposite to the outward direction in the machine-width direction is described as an inward direction in the machine-width direction.

As shown in FIGS. 11 and 12, the traveling device 3 is a crawler-type traveling device having a first crawler traveling body 3A provided on one side (that is, the right side) of the machine body 2 in the machine-width direction K2, and a second crawler traveling body 3B provided on the other side (that is, the left side) of the machine body 2 in the machine-width direction K2. The traveling devices 3 support the machine body 2 so that the machine body 2 can travel. In addition, the machine body 2 is supported on the traveling devices 3 so that the machine body 2 can swivel around a vertical axis (an axis extending in the vertical direction). A dozer device 7 is attached to a front portions of the traveling devices 3.

As shown in FIG. 12, the cabin 5 is mounted on the machine body 2 at a position offsetting to the other side in the machine-width direction K2 from the center of the machine body 2. At a rear portion of the machine body 2, a prime mover 9 and a hood 8 covering the prime mover 9.

As shown in FIGS. 11 and 12, the front working device 4 is arranged in front of the cabin 5. In detail, as shown in FIG. 12, the front working device 4 is arranged to offset from the center of the cabin 5 in the machine-width direction K2 to the one side in the machine-width direction K2.

As shown in FIG. 11, the front working device 4 is supported by a swing bracket 10, and the swing bracket 10 is supported by a support bracket 11. The support bracket 11 is fixed to the machine body 2 and protrudes forward from the machine body 2. The swing bracket 10 is supported by the support bracket 11 so that swing bracket 10 can be turned around a vertical axis.

As shown in FIG. 11, the front working device 4 includes a boom 12, an arm 13, and a working tool (for example, a bucket) 14. The boom 12 has a base portion 12a that is pivoted via a boom shaft 16 on an upper portion of the swing bracket 10 turnably around a horizontal axis (that is, an axis extending in the horizontal direction). In this manner, the boom 12 is swingable up and down. That is, the front working device 4 is swingable up and down.

The arm 13 has a base portion 13a turnably pivoted on a tip end portion 12b of the boom 12 via an arm shaft 17 having an axis parallel to the boom shaft 16. Therefore, the arm 13 is swingable in a crowding direction approaching the boom 12 and in a dumping direction separating away from the boom 12. The working tool 14 is pivoted on a tip end portion 13b of the arm 13 via a working tool shaft 18 having an axis parallel to the arm shaft 17. Therefore, the working tool 14 is swingable in the crowding direction approaching the arm 13 and a dumping direction separating away from the arm 13.

In addition, the front working device 4 includes a boom cylinder 19 configured to drive the boom 12, an arm cylinder 20 configured to drive the arm 13, and a working tool cylinder 21 configured to drive the working tool 14. The boom cylinder 19, arm cylinder 20, and working tool cylinder 21 are constituted of hydraulic cylinders.

The axial direction of the boom shaft 16 corresponds to the machine-width direction K2 with the front working device 4 facing the front of the machine body. The boom 12 has an intermediate portion 12c, which is a longitudinally intermediate (that is a substantially central) bent portion between the base portion 12a and the tip end portion 12b. The intermediate portion 12c has a first portion 12c1 on the base portion 12a side and a second portion 12c2 on the tip end portion 12b side. At the uppermost position of the front working device 4 (that is, the boom 12) shown in FIG. 11, the first portion 12c1 extends in the vertical direction, and the second portion 12c2 extends slantwise forward upwardly from an upper end of the first portion 12c1. In the uppermost position of the front working device 4, the first position 12c1 faces the one side (that is, the right side) of the cabin 5 and is located close to the front of the one side of the cabin 5.

The front working device 4 includes piping members that form hydraulic piping for supplying hydraulic fluid to the boom cylinder 19, the arm cylinder 20, and the working tool cylinder 21. The piping members include hydraulic pipes (e.g., steel pipes) and hoses in which hydraulic fluid flows and hydraulic couplers that connect the hydraulic pipes and hoses. On a back surface of the first portion 12c1 of the boom 12, the piping members and arrangement members for supplying and discharging hydraulic fluid to and from the arm cylinder 20 and the working tool cylinder 21 are provided. The arrangement member is, for example, a clamping member for attaching the hydraulic pipes.

Figure 2:
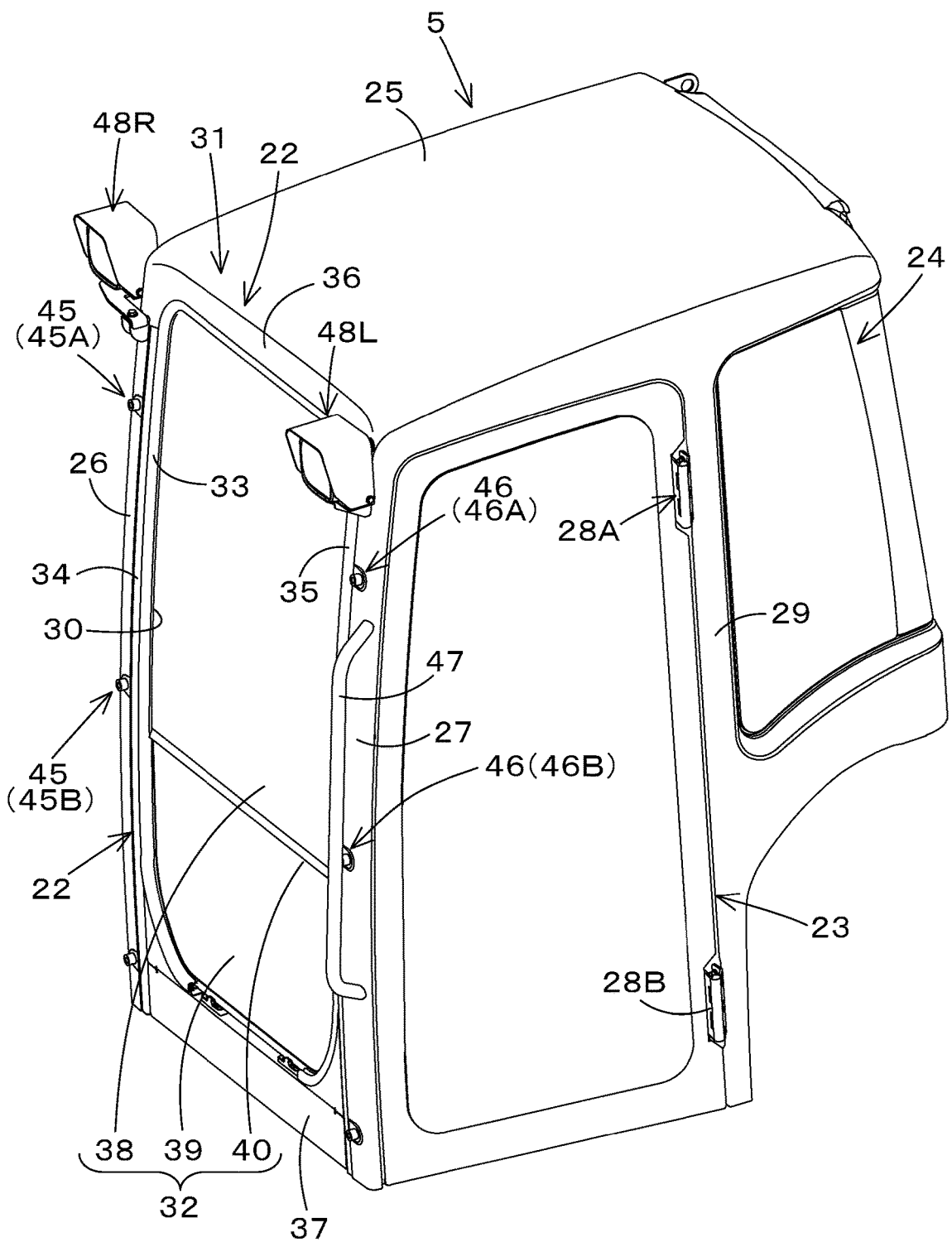
FIG. 2 is a perspective view of the cabin.

As shown in FIG. 2, the cabin 5 includes a front window 22 on the front surface thereof, an entrance door 23 on a front portion of the left side thereof, a side window 24 on a rear portion of the left side thereof, and a roof 25 on the top surface thereof. The entrance door 23 is supported at a rear edge thereof by the center pillar 29 via hinges 28A and 28B, and is opened by swinging backward around the hinges 28A and 28B.

Figure 3:
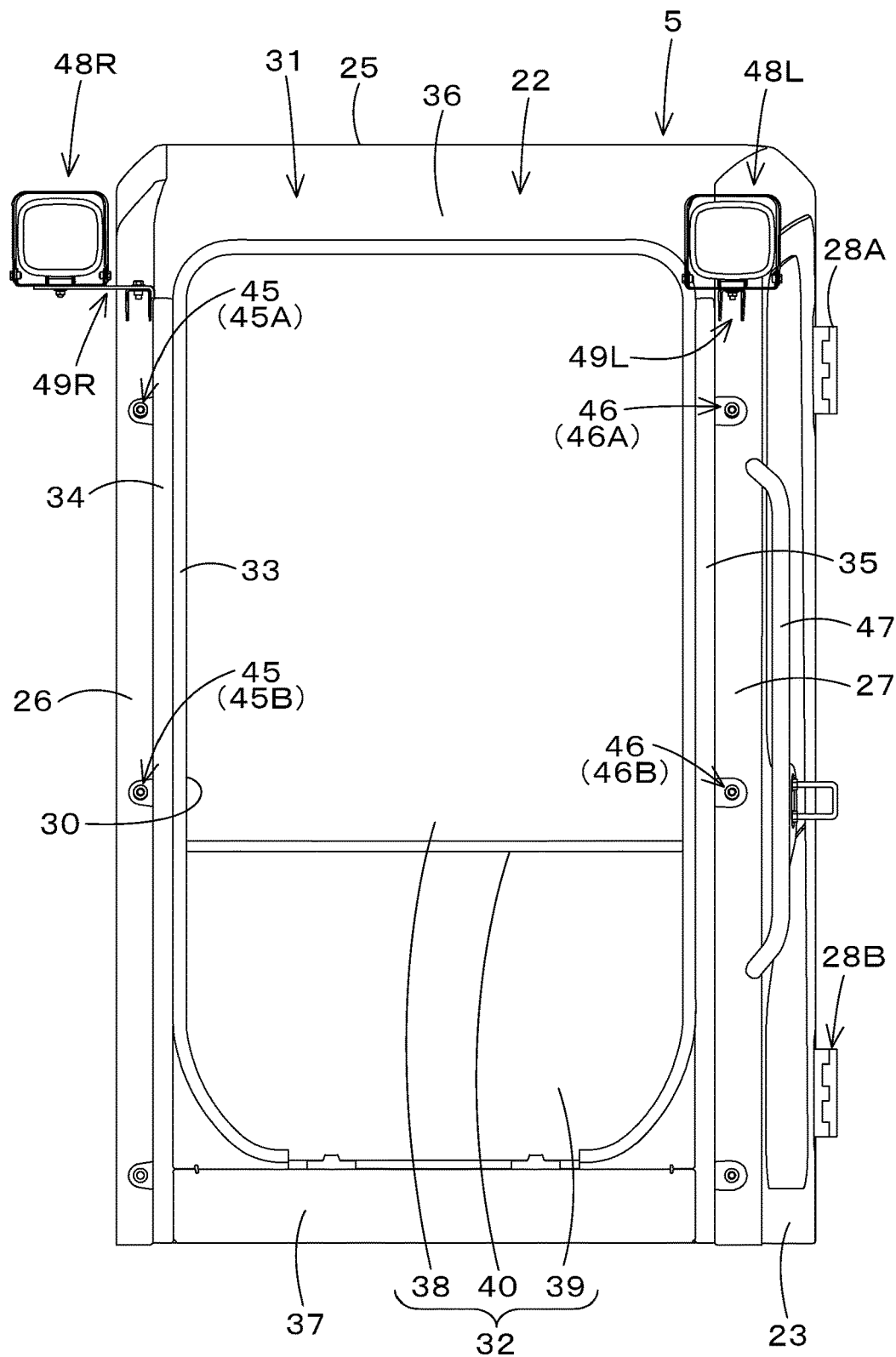
FIG. 3 is a front view of the cabin.

As shown in FIG. 3, the front window 22 includes a window frame 31 that defines a window opening 30 and a front surface panel 32 that closes the window opening 30. A trim seal 33 is provided on an edge portion of the window opening 30. The window frame 31 includes a first vertical frame portion 34 defining one side edge of the window opening 30, a second vertical frame portion 35 defining the other side edge of the window opening 30, an upper frame portion 36 defining an upper edge of the window opening 30, and a lower frame portion 37 defining a lower edge of the window opening 30.

The front surface panel 32 includes an upper panel 38 provided at an upper portion of the window opening 30, a lower panel 39 provided at a lower portion of the window opening 30, and a seal portion 40 that seals between the upper panel 38 and the lower panel 39. The upper panel 38 and the lower panel 39 are formed of light-transmissive material such as glass. The upper panel 38 has a vertical length greater than that of the lower panel 39.

Figure 4:
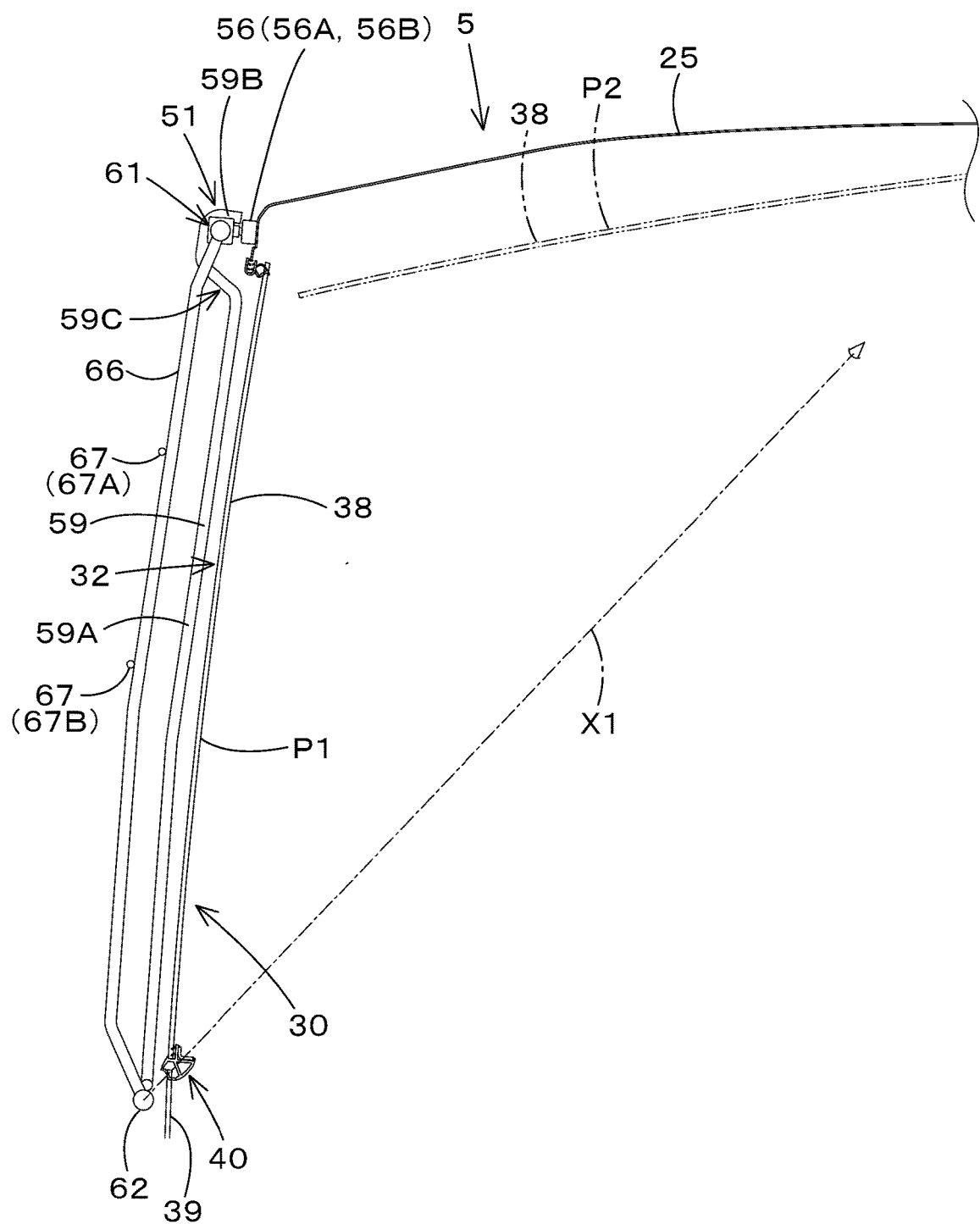
FIG. 4 is a cross-sectional side view of the cabin.

As shown in FIG. 4, the upper panel 38 is movable to an open position P2 on an lower surface side of the roof 25, for example, so as to be opened to introduce the wind into an interior of the cabin 5 and so as to enable an operator to communicate with people outside the cabin.

The lower panel 39 is fitted and fixed to the window frame 31. In the present embodiment, the seal portion 40 is provided on the upper panel 38 side, and moves with the upper panel 38. Alternatively, the seal portion 40 may be provided on the lower panel 39 side.

As shown in FIG. 3, the cabin 5 includes a first front pillar 26 and a second front pillar 27 which are provided on the front surface side thereof and are spaced from each other in the machine-width direction K2. The first front pillar 26 is provided on one side of the cabin 5, the second front pillar 27 is provided on the other side of the cabin 5, and the front window 22 is provided between the first front pillar 26 and the second front pillar 27. That is, the first front pillar 26 is arranged at the one side of the front window 22, and the second front pillar 27 is arranged at the other side of the front window 22.

As shown in FIG. 3, the first front pillar 26 includes a plurality of attachment portions 45. The plurality of attachment portions 45 include a first attachment portion 45A provided at an upper portion of the first front pillar 26 and a second attachment portion 45B provided below the first attachment portion 45A. The second front pillar 27 also includes a plurality of attachment portions 46. The plurality of attachment portions 46 include a third attachment portion 46A provided at an upper portion of the second front pillar 27 and a fourth attachment portion 46B provided below the third attachment portion 46A. The attachment portions 45 and 46 are constituted of bosses (that is, cylindrical members) having threaded holes. The threaded holes are holes formed on inner circumferences thereof with female threads. The first attachment portion 45A and the third attachment portion 46A are located on opposite lateral sides of an upper portion of the upper panel 38. The second attachment portion 45B and the fourth attachment portion 46B are located on opposite lateral sides of a lower portion of the upper panel 38.

As shown in FIGS. 2 and 3, a handrail member 47 is provided on the second front pillar 27 to be grasped by an operator when boarding and alighting or the like. The handrail member 47 is a rod (or a bar) or the like fixed at upper and lower end portions thereof to the second front pillar 27. A gap into which a hand is inserted is provided between the handrail member 47 and the second front pillar 27. The third attachment portion 46A is provided above the handrail member 47. The fourth attachment portion 46B is provided between the upper and lower ends of the handrail member 47.

As shown in FIG. 3, a first work lamp 48R is arranged at one lateral side of the upper portion of the first front pillar 26. The first work lamp 48R is attached to a first lamp bracket 49R that is provided on the upper portion of the first front pillar 26. A second work lamp 48L is arranged forward of the upper portion of the second front pillar 27. The second work lamp 48L is attached to a second lamp bracket 49L that is provided on the upper portion of the second front pillar 27. The first work lamp 48R and the second work lamp 48L are lamps that illuminate forward from the working machine 1 during work in the evening or at night.

The first attachment portion 45A is provided below the first lamp bracket 49R, and the third attachment portion 46A is provided below the second lamp bracket 49L.

As shown in FIGS. 1 and 11, the working machine 1 has a front guard 51 attached to the front surface side of the cabin 5. The front guard 51 is provided in front of the front window 22.

Figure 5:
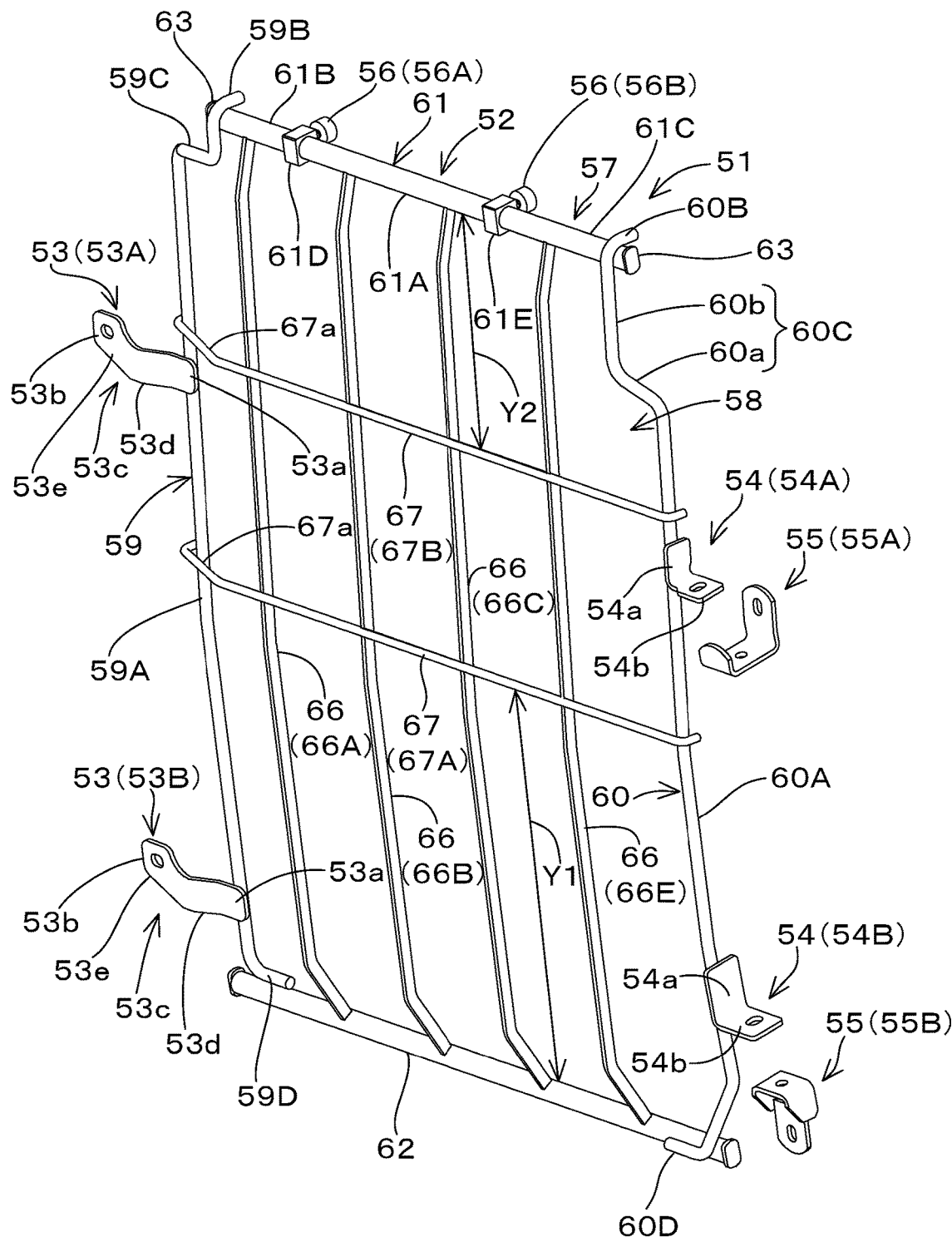
FIG. 5 is a perspective view of the front guard.

As shown in FIGS. 1 and 5, the front guard 51 includes a guard body 52, attachment members (including a first attaching stay 53, a second attaching stay 54, and an attachment bracket 55) for attaching the guard body 52 to the cabin 5, and a vibro-isolating member 56. The guard body 52 includes a guard frame 57 that defines the outer contour of the guard body 52, and a lattice portion 58 provided inside the guard frame 57.

First, the guard frame 57 will be described.

As shown in FIG. 1, the guard frame 57 has a first frame member 59 arranged on one side of the front window 22 in the machine-width direction (that is, the width direction) K2, a second frame member 60 arranged on the other side of the front window 22 in the machine-width direction K2, a third frame member 61 connecting upper portions of the first frame member 59 and the second frame member 60, and a fourth frame member 62 connecting lower portions of the first frame member 59 and the second frame member 60.

The first frame member 59 is formed of a rod and includes a main rod portion (referred to as a first main rod portion) 59A, an upper joint portion (referred to as a first upper joint portion) 59B, a connecting portion (referred to as a first connecting portion) 59C, and a lower joint portion (referred to as a first lower joint portion) 59D. The first main rod portion 59A is the main portion of the first frame member 59, that is, a portion that occupies most of the first frame member 59, and defines upper to lower portions of the first frame member 59. The first main rod portion 59A is arranged in front of one lateral side portion of the upper panel 38. In detail, the first main rod portion 59A extends vertically along the upper panel 38 from top to bottom while keeping a distance from the upper panel 38 (see FIG. 4). The first main rod portion 59A is disposed behind the boom 12 (that is, the front working device 4).

Figure 8:
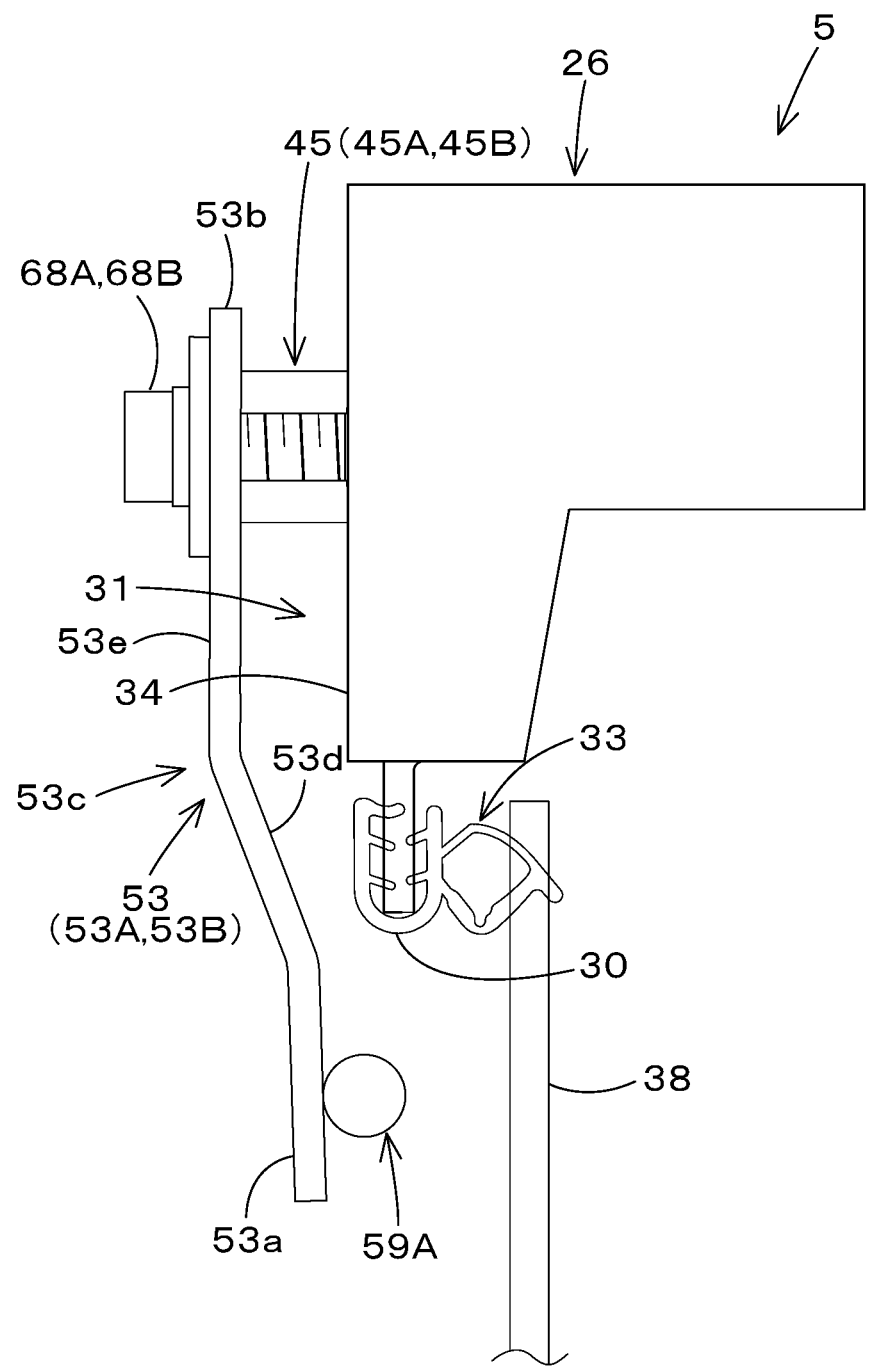
FIG. 8 is a cross-sectional plan view of a right portion of the cabin.

As shown in FIG. 8, the first main rod portion 59A is arranged in close proximity to the upper panel 38 so that the rear portion of the first main rod portion 59A is located behind a front surface of the first front pillar 26 and a front surface of the first vertical frame portion 34.

As shown in FIG. 1, the first upper joint portion 59B is fixed to an upper portion of the one lateral side end of the third frame member 61. The first upper joint portion 59B is located leftward in the machine body relative to the first main rod portion 59A. The first connecting portion 59C connects an upper portion of the first main rod portion 59A with a lower portion of the first upper joint portion 59B. In detail, the first connecting portion 59C extends, in the front view shown in FIG. 1, slantwise upwardly in the machine leftward direction from the upper end of the first main rod portion 59A, extends, in the plan view shown in FIG. 7, slantwise forwardly in the machine leftward direction from the upper and of the first main rod portion 59A, and is joined to the lower portion of the first upper joint portion 59B.

As shown in FIG. 1 and FIG. 5, the first lower joint portion 59D extends in the machine leftward direction from a lower end of the first main rod portion 59A and is fixed to an upper portion of the one lateral side of the fourth frame member 62.

As shown in FIGS. 1 and 5, the second frame member 60 is formed of a rod and includes a main rod portion (referred to as a second main rod portion) 60A, an upper joint portion (referred to as a second upper joint portion) 60B, a connecting portion (referred to as a second connecting portion) 60C, and a lower joint portion (referred to as a second lower joint portion) 60D. The second main rod portion 60A is a main portion of the first frame member 59, that is, a portion that occupies most of the second frame member 60, and is arranged in front of the second vertical frame portion 35. In detail, the second main rod portion 60A has an upper end portion located in the vicinity of the lower end of the second work lamp 48L and extends downward so as to have a lower portion extending slantwise downwardly in the machine rightward direction. The second upper joint portion 60B is fixed to an upper portion of the other lateral side end portion of the third frame member 61. The second upper connecting portion 60B is located in the machine rightward direction from the second main rod portion 60A. The second connecting portion 60C connects an upper portion of the second main rod portion 60A with a lower portion of the second upper joint portion 60B. In detail, the second connecting portion 60C includes a first portion 60a extending in the machine rightward direction from the upper end of the second main rod portion 60A, and a second portion 60b extending upwardly in the machine rightward direction from a right end of the first portion 60a and joined to a lower end of the second upper joint portion 60B. The second lower joint portion 60D extends in the machine rightward direction from a lower end of the second main rod 60A and is fixed to a front portion of the other lateral side portion of the fourth frame member 62.

Figure 6:
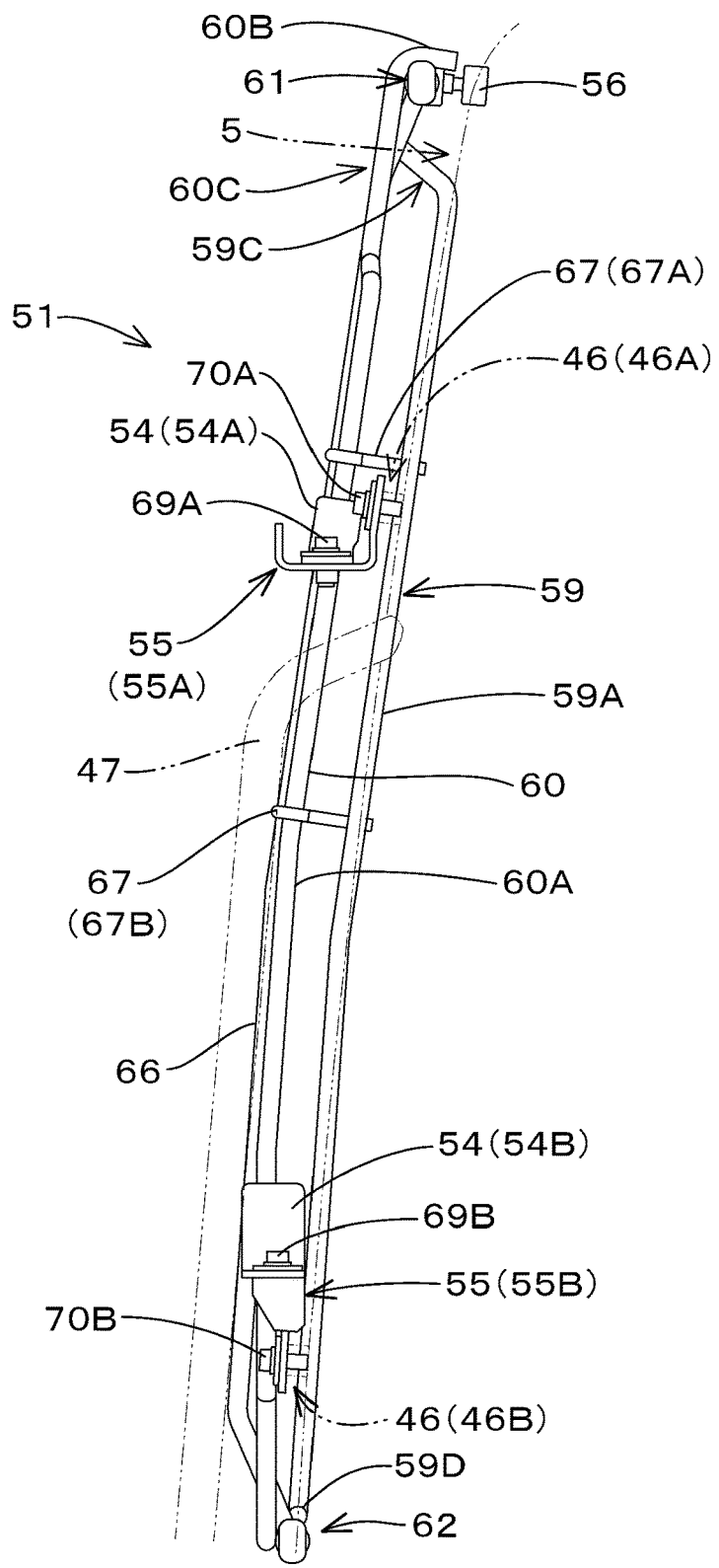
FIG. 6 is a side view of the front guard.

As shown in FIG. 6, the first main rod portion 59A is located rearward of the second frame member 60 (that is, the second main rod 60A). That is, the first main rod portion 59A is formed closer to the cabin 5 (that is, the operator seat 6) relative to the second main rod portion 60A. Therefore, the front working device 4 (including the piping members and the arrangement members provided on the back surface of the first portion 12c1 of the boom 12, for example) is prevented from contacting the first main rod portion 59A (that is, the front guard 51) when the front working device 4 (that is, the boom 12) is lifted to the uppermost position. In addition, there is no need for troublesome work such as replacement of the boom cylinder 19 in order to prevent the front working device 4 from contacting the front guard 51. In addition, even when the front guard 51 is installed, a swing height of the front working device 4 and a working rotation radius of the front working device 4 at the uppermost position are not restricted, and accordingly a loading work to a truck, and the like can be performed smoothly.

Figure 10:
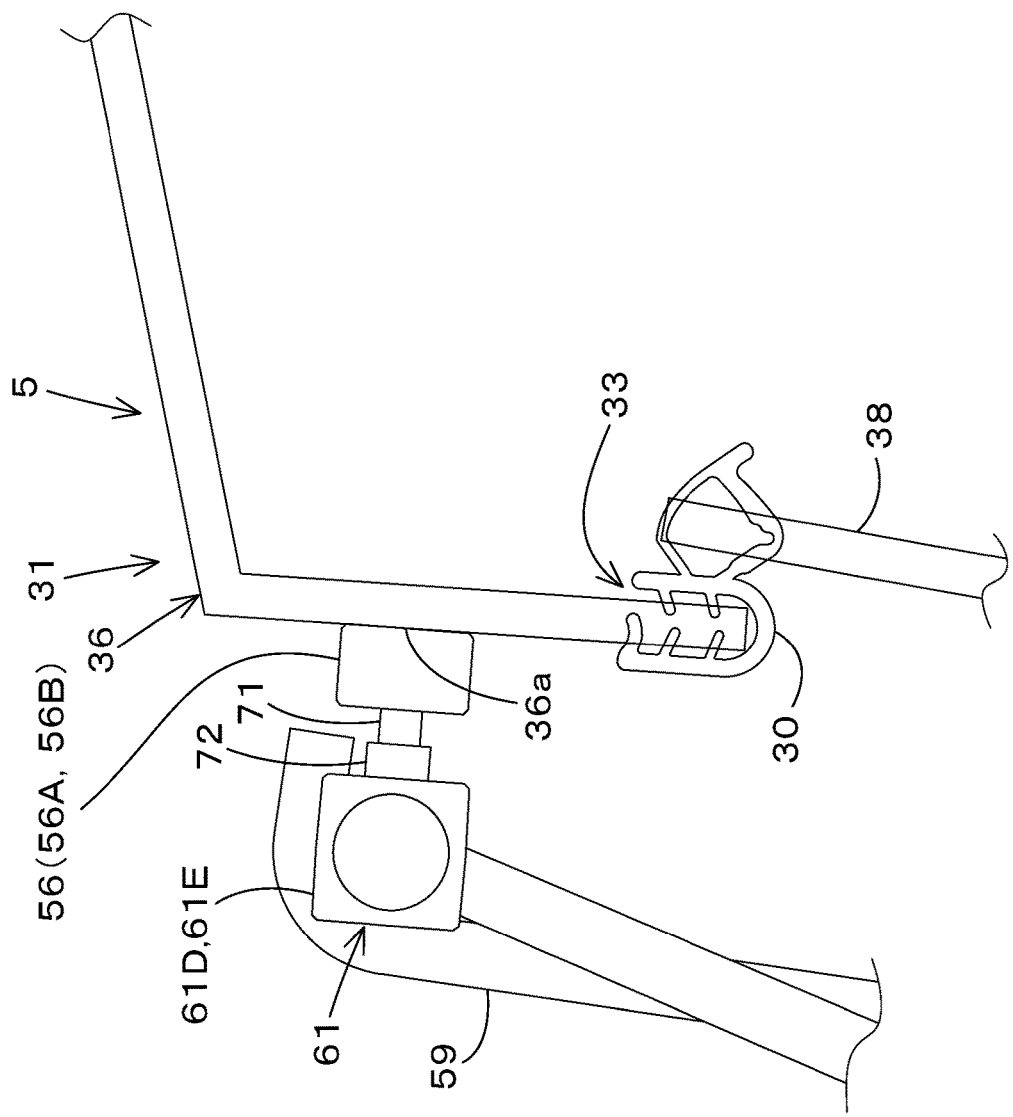
FIG. 10 is a cross-sectional side view of an upper portion of the cabin.

As shown in FIG. 1, the third frame member 61 is formed in a straight line shape extending in the machine-width direction K2, and is arranged above the window opening 30. In detail, the third frame member 61 is arranged at a position opposed to the upper frame portion 36, as shown in FIG. 10. In other words, the third frame member 61 is arranged at a position overlapped with an upper edge portion of the window opening 30 in an operator's line of sight. Therefore, the third frame member 61 is prevented from interfering with the operator's sight. End members 63 are fixed to both ends of the third frame member 61. In the present embodiment, the third frame member 61 includes a first rod body 61A disposed at a central portion in the machine-width direction K2, a second rod body 61B disposed in the machine rightward direction from the first rod body 61A, a third rod body 61C disposed in the machine leftward direction from the first rod body 61A, a first connecting body 61D connecting the first rod body 61A to the second rod body 61B, and a second connecting body 61E connecting the first rod body 61A to the third rod body 61C. In addition, a length in the machine-width direction K2 of a right portion of the third frame member 61 from the center of the cabin 5 (i.e., a cabin center) to the machine-rightward directional end portion thereof is shorter than a length in the machine-width direction K2 of a left portion of the third frame member 61 from the cabin center to the left end portion of the machine-leftward directional end portion thereof. That is, the third frame member 61 is formed to have the one lateral side end portion thereof closer to the cabin center than the boom 12. Therefore, the front working device 4 is prevented from contacting the third frame member 61 when the front working device 4 is lifted to the uppermost position.

As shown in FIG. 1, the fourth frame member 62 is formed of a rod having a straight line shape extending in the machine-width direction K2, and is arranged below the seal portion 40. In detail, as shown in FIG. 4, the fourth frame member 62 is disposed diagonally forward of the seal portion 40 and in the operator's line of sight X1. In other words, the fourth frame member 62 is positioned to overlap the seal portion 40 when viewed along a direction of the operator's line of sight X1. Therefore, the fourth frame member 62 is prevented from interfering with the operator's sight, since the fourth frame member 62 overlaps the seal portion 40 when viewed from the operator. End members 64 are fixed to both ends of the fourth frame member 62.

Next, the lattice portion 58 will be described.

As shown in FIGS. 1 and 5, the lattice portion 58 includes a plurality of vertical bars 66 (that is, first to fourth vertical bars 66A to 66D) and a plurality of horizontal bars 67 (that is, a first horizontal bar 67A and a second horizontal bar 67B).

The first to fourth vertical bars 66A to 66D are interposed between the third frame member 61 and the fourth frame member 62, and are fixed at upper ends thereof to the third frame member 61, and at lower ends thereof to the fourth frame member 62. The first to fourth vertical bars 66A to 66D are juxtaposed at intervals in the machine-width direction K2 between the first frame member 59 and the second frame member 60. Further, each of the first to fourth vertical bars 66A to 66D is formed by a strip plate. The strip plates serving as the first to fourth vertical bars 66A to 66D are arranged so that their plate-thickness directions correspond to the machine-width direction K2 when viewed by an operator facing in the machine-forward direction. Therefore, good visibility is ensured for the operator when the cabin 5 faces in the machine-forward direction. In addition, by using the strip plates, the visibility can be improved compared to a case where round rods or the like are used to achieve the same strength. Alternatively, by using the strip plates, the strength can be improved compared to the case where round rods or the like are used to achieve the same visibility.

The first horizontal bar 67A and the second horizontal bar 67B are formed of rod-shaped members. The first horizontal bar 67A and the second horizontal bar 67B are interposed between the first frame member 59 and the second frame member 60, and are fixed at one ends thereof to the first frame member 59, and at the other ends thereof to the second frame member 60. In addition, the first horizontal bar 67A and the second horizontal bar 67B are provided across the first to fourth vertical bars 66A to 66D, and are fixed at intermediate portions thereof to the first to fourth vertical bars 66A to 66D.

The first horizontal bar 67A is arranged substantially at the center between the third frame member 61 and the fourth frame member 62. The second horizontal bar 67B is arranged substantially at the center between the first horizontal bar 67A and the third frame member 61.

Figure 7:
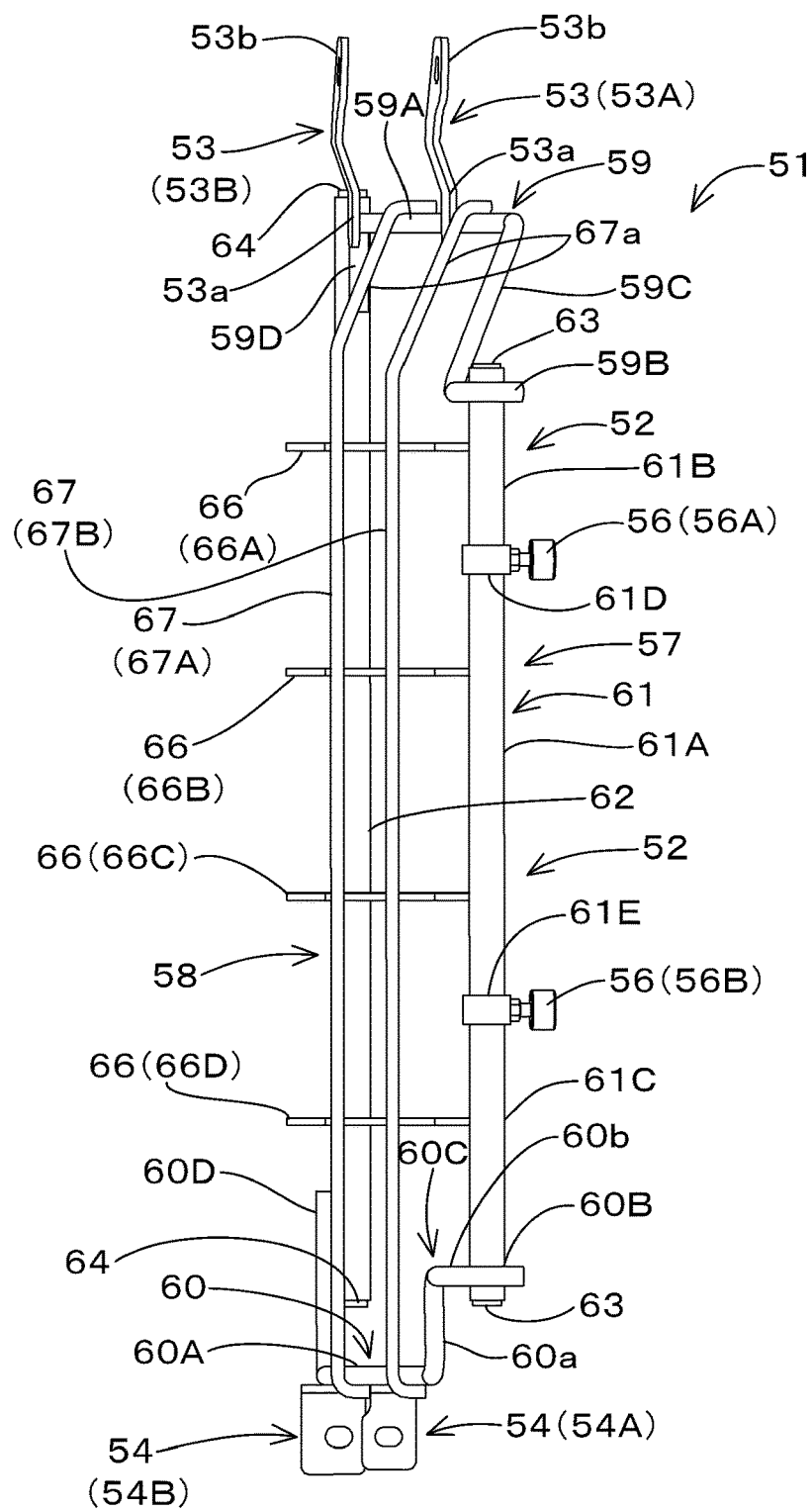
FIG. 7 is a plan view of the front guard.

As shown in FIG. 7, the horizontal bars 67 include respective machine-rightward directional side portions defined as inclined portions 67a extending slantwise backward and outwardly in the machine-width direction K2. Therefore, the front working device 4 is prevented from contacting the horizontal bars 67 when the front working device 4 is lifted to the uppermost position.

As shown in FIG. 5, an interval Y1 between the fourth frame member 62 and the horizontal bar 67 (specifically, the first horizontal bar 67A) neighboring to the fourth frame member 62 is greater than an interval Y2 between the third frame member 61 and the horizontal bar 67 (specifically, the second horizontal bar 67B) neighboring to the third frame member 61. Therefore, good visibility is achieved for the operator when looking diagonally forward and downward to perform a ground work with the working tool 14 and the dozer device 7.

The number of vertical bars 66 and horizontal bars 67 constituting the lattice portion 58 is not particularly limited, and may be changed as appropriate in consideration of visibility, required strength, cost, weight, and the like.

Next, the first attaching stays 53, the second attaching stays 54 and the attachment brackets 55 for attaching the guard body 52 (that is, the guard frame 57) to the cabin 5 will be described.

Each of the first attaching stays 53 is a member for attaching the first frame member 59 to the first front pillar 26.

As shown in FIG. 1, each of the first attaching stays 53 is formed of a single plate. The first attaching stays 53 includes an upper stay 53A provided on an upper portion of the first frame member 59 and a lower stay 53B provided on a lower portion of the first frame member 59. The upper stay 53A and the lower stay 53B are formed in a similar shape.

The upper stay 53A includes a base portion 53a that is welded to the first frame member 59 and a fixture portion 53b that is bolted to the first front pillar 26. Similarly, the lower stay 53B includes a base portion 53a and a fixture portion 53b.

As shown in FIG. 8, the fixture portion 53b of the upper stay 53A is attached to the first attachment portion 45A by a bolt 68A, and the fixture portion 53b of the lower stay 53B is attached to the second attachment portion 45B by a bolt 68B.

By forming the first attaching stay 53 with a flat plate and attaching the first attaching stay 53 directly to the first front pillar 26, a protruding amount of the first attaching stay 53 protruding forward from the first front pillar 26 can be reduced, and the front working device 4 (specifically, the boom 12) can be prevented from contacting the first attaching stay 53 when the front working device 4 (specifically, the boom 12) is lifted to the uppermost position.

As shown in FIG. 5, each of the upper stay 53A and the lower stay 53B includes an intermediate portion 53c between the base portion 53a and the fixture portion 53b. The intermediate portion 53c includes a first portion 53d extending from the base portion 53a outwardly in the machine-width direction K2, and a second portion 53e extending slantwise upwardly outward in the machine-width direction K2 from the first portion 53d. As shown in FIG. 8, the base portion 53a is disposed rearward of the fixture portion 53b, and the first portion 53d extends diagonally rearward from the base portion 53a to the second portion 53e. As described above, a bending portion is formed in an intermediate portion of the first attaching stay 53.

Since the fixture portion 53b is rigidly attached to the first front pillar 26 (that is, the attachment portion 45), when an impact is applied to the cabin 5, the impact propagates in the direction to the base portion 53a so as to apply a stress to the welded portion of the base portion 53a. However, by providing the bending portion in the intermediate portion of the first attaching stay 53, the stress that propagates from the fixed portion 53a to the base portion 53a can be released at this bending portion, and thus the stress can be prevented from being applied to the welded portion of the base portion 53a.

The second portion 53e may be formed to extend slantwise downward from the first portion 53d outwardly in the machine-width direction K2. It is not required that the second portion 53e is inclined upward or downward from the first portion 53d outwardly in the machine-width direction K2, and may be formed to extend in the horizontal direction.

The second attaching stays 54 and the attachment brackets 55 are members for attaching the second frame member 60 to the second front pillar 27. Each of the second attaching stays 54 is fixed to the second frame member 60 and bolted to the attachment bracket 55, and each of the attachment brackets 55 is bolted to the second front pillar 27.

As shown in FIGS. 5 and 9, each of the second attaching stays 54 includes an upper stay 54A provided on an upper portion of the second frame member 60 and a lower stay 54B provided on a lower portion of the second frame member 60. Each of the upper stay 54A and the lower stay 54B includes a first wall 54a welded to the second frame member 60 and a second wall 54b extending in the machine leftward direction from the lower end of the first wall 54a, and is formed in an L-shape in front view.

The attachment bracket 55 includes a first bracket 55A attached to an upper portion of the second front pillar 27 and a second bracket 55B attached to a lower portion of the second front pillar 27. The first bracket 55A is bolted to the third attachment portion 46A, and the second bracket 55B is bolted to the fourth attachment portion 46B. In addition, the upper stay 54A is bolted to the first bracket 55A, and the lower stay 54B is bolted to the second bracket 55B.

As shown in FIG. 9, the first bracket 55A includes an attachment wall 55a (referred to as a first attachment wall) that is fastened to the third attachment portion 46A by a bolt 70A, a placing wall 55b (referred to as a first placing wall) that extends forward from a lower end of the first attachment wall 55a, and a retaining wall 55c that extends upward from a front end of the first placing wall 55b. The second wall 54b of the upper stay 54A is placed on the first placing wall 55b from above and is fastened to the first placing wall 55b by a bolt 69A.

The second bracket 55B includes a placing wall 55d (referred to as a second placing wall), a first side wall 55e extending downward from one side in the machine-width direction K2 of the second placing wall 55d, a second side wall 55f extending downward from the other side in the machine-width direction K2 of the second placing wall 55d, and an attachment wall 55g (referred to as a second attachment wall) fixed between the first side wall 55e and the second side wall 55f. The second wall 54b of the lower stay 54B is fastened to the second placing wall 55d by a bolt 69B. The second attachment wall 55g is fastened to the fourth attachment portion 46B by a bolt 70B.

For example, when the second attaching stay 54 is bolted directly to the second front pillar 27, a tightening stress is generated. However, by bolting the attachment bracket 55 to the second front pillar 27 and bolting the second attaching stay 54 to the attachment bracket 55, that is, by providing a member between the second attaching stay 54 and the attachment portion 46, the tightening stress can be prevented from being generated.

As for the machine-rightward side of the front guard 51, the first attaching stays 53 are bolted directly to the first front pillar 26. However, as for the machine-leftward side of the front guard 51, the second attaching stays 54 are attached to the second front pillar 27 via the respective attachment brackets 55 to release the tightening stress.

The bolt insertion holes (that is, holes to which bolts are inserted) formed in the first attaching stay 53 are formed as long holes elongated in the machine-width direction K2, the bolt insertion holes formed in the second attaching stay 54 are formed as long holes elongated in the fore-and-aft direction, and the bolt insertion holes formed in the first attachment wall 55a and the second attachment wall 55g of the attachment bracket 55 are formed as long holes elongated in the vertical direction. This configuration suppresses strain generated in a process of attaching.

In attaching the front guard 51 to the cabin 5, the second attaching stay 54 can be placed on the attachment bracket 55, thereby reducing a force to support the front guard 51 and reducing the burden of the attaching operation. In addition, the retaining wall 55c can restrict the front guard 51 from moving forward during installation, which can also reduce the burden of the attaching operation.

Next, the vibro-isolating members 56 will be described.

Each of the vibro-isolating members 56 is formed of an elastic member such as rubber, for example. As shown in FIG. 5, the vibro-isolating members 56 include a first vibro-isolating member 56A and a second vibro-isolating member 56B. The first vibro-isolating member 56A is attached to a first connecting body 61D, and the second vibro-isolating member 56B is attached to a second connecting body 61E.

As shown in FIG. 10, each of the vibro-isolating members 56 includes a threaded shaft 71 (that is a rod-shaped member whose outer circumference is formed with male threads) protruding forward from a front portion thereof. A lock nut 72 is screwed onto the threaded shaft 71. Each of the first and second connecting bodies 61D and 61E has a threaded hole into which the threaded shaft 71 is screwed. By screwing the threaded shaft 71 of the first vibro-isolating member 56A into the threaded hole of the first connecting body 61D and fixing the threaded shaft 71 with the lock nut 72, the first vibro-isolating member 56A is fastened to the first connecting body 61D. The second vibro-isolating member 56B is fastened to the second connecting body 61E in the same manner. Each of the vibro-isolating members 56 screwed into the first and second connecting bodies 61D and 61E can be adjusted in position by rotating the threaded shaft 71 in a screwing or loosening direction.

As shown in FIG. 10, the vibro-isolating member 56 is pressed against the upper frame portion 36. In other words, an upper portion of the window frame 31 (that is, the upper frame portion 36) has a contacting portion 36a against which the vibro-isolating member 56 is pressed. The contacting portion 36a is formed to have a flat shape.

For example, if the front guard 51 is light-weighted, the upper portion of the front guard 51 is liable to vibrate because of vibrations such as those caused by traveling of the working machine 1 propagated to the front guard 51. At this time, due to the vibro-isolating members 56 elastically contacting the contacting portion 36a, the upper portion of the front guard 51 can be prevented from being vibrated. In detail, at the lower portion of the front guard 51, since there is nothing to interfere with the attachment of the front guard 51, the corresponding first attaching stay 53 and the corresponding second attaching stay 54 can be provided close to the fourth frame member 62 so as to ensure a sufficient strength for supporting the lower portion of the front guard 51. On the contrary, since the upper portion of the front guard 51 is provided with the first and second work lamps 48L and 48R, it is difficult to provide the first and second attaching stays 53 and 54 closer to the third frame member 61. Thus, by providing the third frame member 61 with the vibro-isolating members 56, the upper portion of the front guard 51 can be well supported.

For example, in order to firmly support the upper portion of the front guard 51, it may be considered that the third frame member 61 is bolted to the upper frame part 36. However, in this case, the man-hours required to attach and detach the front guard 51 will increase, and the attachment and detachment of the front guard 51 will become troublesome. In this regard, the installation of the vibro-isolating members 56 eliminates such troublesome operation.

In the above-mentioned embodiment, the front guard 51 is attached to the left and right front pillars (that is, pillar members) of the cabin 5. However, the configuration for attaching the front guard 51 is not limited thereto, and the front guard 51 may be attached to the pillars (that is, the pillar members) of the canopy arranged in the right and left front of the operator seat 6.

As described above, the working machine according to the present embodiment includes the machine body 2, the operator seat 6 mounted on the machine body 2, the front working device 4 swingable upward and downward, the front working device 4 being provided forward of the operator seat 6 and on one side in the machine-width direction K2 eccentric with respect to the central portion of the operator seat 6, and the front guard 51 provided forward of the operator seat 6. The front guard 51 includes the first frame member 59 provided forward of the operator seat 6 and on the one side, and the second frame member 60 provided forward of the operator seat 6 and on another side opposite to the one side. The first frame member 59 includes the main rod portion 59A defining upper and lower portions of the first frame member 59, extending between the upper and lower portions of the first frame member 59, and provided rearward of the front working device 4. The main rod portion 59A is formed to be positioned in the machine fore-and-aft direction K1 closer to the operator seat 6 than the second frame member 60.

According to this configuration, the main rod portion 59A located behind the front working device 4 is formed to be laterally closer to the operator seat 6 than the second frame member 60, so that the front working device 4 can be prevented from interfering with the main rod portion 59A.

In addition, the working machine 1 further includes the cabin 5 including the front window 22 defining the front surface of the cabin 5. The front guard 51 is provided forward of the cabin 5. The cabin 5 includes the first front pillar 26 provided on one side of the front window 22, and the second front pillar 27 provided on the other side of the front window 22. The front guard 51 includes the first attaching stay 53 provided on the first frame member 59 and attached to the first front pillar 26, the second attaching stay 54 provided on the second frame member 60 and attached to the second front pillar 27, the third frame member 61 joining an upper portion of the first frame member 59 and an upper portion of the second frame member 60 to each other, and the vibro-isolating member 56 provided on the third frame member 61 and pressed against an upper portion of the front window 22.

According to this configuration, vibration of the upper portion of the front guard 51 can be prevented.

The working machine 1 further includes the attachment bracket 55 fixed to the second front pillar 27 by bolting. The first attaching stay 53 is formed of a single plate and includes the base portion 53a fixed to the first frame member 59 by welding, and the fixture portion 53b fixed to the first front pillar 26 by bolting. The second attaching stay 54 is fixed to the attachment bracket 55 by bolting.

According to this configuration, the front working device 4 can be prevented from interfering with the first attaching stay 53 when the front working device 4 is lifted to the uppermost position. In addition, by attaching the second attaching stay 54 to the second front pillar 27 via the attachment bracket 55, a tightening stress by bolts can be released.

The first attaching stay 53 includes the intermediate portion 53c between the base portion 53a and the fixture portion 53b. The intermediate portion 53c includes the first portion 53d extending outward in the machine-width direction K2 from the base portion 53a, and the second portion 53e extending slantwise upwardly or downwardly outward in the machine-width direction K2 from the first portion 53d.

According to this configuration, the stress propagating from the fixture portion 53b to the base portion 53a can be released at the bending portion between the first portion 53d and the second portion 53e, thereby suppressing the stress applied to the base portion 53a.

The front window 22 includes the window frame 31 defining the window opening 30. The third frame member 61 is positioned to overlap an upper edge of the window opening 30 along a visual line from the operator.

According to this configuration, the third frame member 61 can be prevented from interfering with the operator's sight.

The front window 22 includes the window frame 31 defining the window opening 30, and the front surface panel 32 covering the window opening 30. The front surface panel 32 includes the upper panel 38 openably covering an upper area of the window opening 30, the lower panel 39 fixedly fitted to the window frame 31 to cover a lower area of the window opening 30, and the seal portion 40 between the upper panel 38 and the lower panel 39. The front guard 51 includes the fourth frame member 62 joining a lower portion of the first frame member 59 and a lower portion of the second frame member 60 to each other. The fourth frame member 62 is positioned to overlap the seal portion 40 along the visual line X1 from the operator.

According to this configuration, the fourth frame member 62 can be prevented from interfering with the operator's sight.

The front guard 51 includes the lattice portion 58 between the first frame member 59 and the second frame member 60. The lattice portion 58 includes the plurality of vertical bars 66 extending between the third frame member 61 and the fourth frame member 62 and aligned at intervals in the machine-width direction K2, and the plurality of horizontal bars 67 crossing the vertical bars 66 and aligned vertically at intervals. The interval Y1 between the fourth frame member 62 and the horizontal bar 67 neighboring to the fourth frame member 62 is wider than the interval Y2 between the third frame member 61 and the horizontal bar 67 neighboring to the third frame member 61.

According to this configuration, the visibility of the lower portion of the front guard 51 can be improved, thereby improving the visibility of a working portion when a ground work is performed by the front working device 4, for example.

The attachment bracket 55 includes the attachment wall 55a fixed to the second front pillar 27 by bolting, the placing wall 55b extending forward from a lower portion of the attachment wall 55a, and the retaining wall 55c extending upward from a front portion of the attachment wall 55a. The second attaching stay 54 is placed on the placing wall 55b and is fixed to the placing wall 55b by bolting.

According to this configuration, in attaching the front guard 51, the burden of the attachment work can be reduced by placing the second attaching stay 54 on the placing wall 55b. In addition, the forward movement of the second attaching stay 54 can be regulated by the regulating wall 55c, and the front guard 51 can be prevented from falling forward from the attachment bracket 55 during the attachment operation.

A front guard 51 according to the present embodiment attached to the working machine 1, the working machine 1 including the machine body 2, the operator seat 6 mounted on the machine body 2, and the front working device 4 swingably upward and downward, the front working device 4 being provided forward of the operator seat 6 and on one side in the machine-width direction K2 eccentric with respect to a central portion of the operator seat 6. The front guard 51 is provided forward of the operator seat 6. The front guard 51 includes the first frame member 59 provided at one width directional side of the front guard 51, and the second frame member 60 provided at the other width directional side of the front guard 51. The first frame member 59 includes the main rod portion 59A defining upper and lower portions of the first frame member 59, extending between the upper and lower portions of the first frame member 59, and provided rearward of the front working device 4. The main rod portion 59A is formed so that, in a state where the front guard 51 is attached to the working machine 1, the main rod portion 59A is positioned in the machine fore-and-aft direction K1 closer to the operator seat 6 than the second frame member 60.

According to this configuration, the main rod portion 59A located behind the front working device 4 is formed closer to the operator seat 6 than the second frame member 60, thereby preventing the front working device 4 from interfering with the main rod portion 59A.

The front guard 51 further includes the first attaching stay 53 provided on the first frame member 59 and attached to the working machine 1, the second attaching stay 54 provided on the second frame member 60 and attached to the working machine 1, the third frame member 61 joining an upper portion of the first frame member 59 and an upper portion of the second frame member 60 to each other, and the vibro-isolating member 56 provided on the third frame member 61 and pressed against a portion of the working machine 1.

According to this configuration, vibration of the upper portion of the front guard 51 can be prevented.

The front guard 51 further includes the attachment bracket 55 fixed to the second attaching stay 54 by bolting and fixed to the working machine 1 by bolting. The first attaching stay 53 is formed of a single plate and includes the base portion 53a fixed to the first frame member 59 by welding, and the fixture portion 53b fixed to the working machine 1 by bolting.

According to this configuration, the front working device 4 can be prevented from interfering with the first attaching stay 53 when the front working device 4 is lifted to the uppermost position. In addition, by attaching the second attaching stay 54 to the working machine 1 via the attachment bracket 55, a tightening stress by bolts can be released.

The first attaching stay 53 includes the intermediate portion 53c between the base portion 53a and the fixture portion 53b, and the intermediate portion 53c includes the first portion 53d extending outward in the width direction from the base portion 53a, and the second portion 53e extending slantwise outward in the width direction from the first portion 53d along the extension direction of the first frame member 59.

According to this configuration, the stress propagating from the fixture portion 53b to the base portion 53a can be released at the bending portion between the first portion 53d and the second portion 53e, thereby suppressing the stress applied to the base portion 53a.

The front guard 51 includes the fourth frame member 62 joining a lower portion of the first frame member 59 and a lower portion of the second frame member 60 to each other, and the lattice portion 58 between the first frame member 59 and the second frame member 60. The lattice portion 58 includes the plurality of vertical bars 66 extending between the third frame member 61 and the fourth frame member 62 and aligned at intervals in the width direction, and the plurality of horizontal bars 67 crossing the vertical bars 66 and aligned vertically at intervals. The interval Y1 between the fourth frame member 62 and the horizontal bar 67 neighboring to the fourth frame member 62 is wider than the interval Y2 between the third frame member 61 and the horizontal bar 67 neighboring to the third frame member 61.

According to this configuration, the visibility of the lower portion in the front guard 51 can be improved, thereby improving the visibility of a working portion when a ground work is performed by the front working device 4, for example.

The attachment bracket 55 includes the attachment wall 55a fixed to the working machine 1 by bolting, the placing wall 55b extending forward from a lower portion of the attachment wall 55a, and the retaining wall 55c extending upward from a front portion of the placing wall 55b. The second attaching stay 54 is placed on the placing wall 55b and is fixed to the placing wall 55b by bolting.

According to this configuration, in attaching the front guard 51, the burden of the attachment work can be reduced by placing the second attaching stay 54 on the placing wall 55b. In addition, the forward movement of the second attaching stay 54 can be regulated by the regulating wall 55c, and the front guard 51 can be prevented from falling forward from the attachment bracket 55 during the attachment operation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   an operator seat mounted on the machine body;
   a front working device swingable upward and downward, the front working device being provided forward of the operator seat and on one side in a machine-width direction eccentric with respect to a central portion of the operator seat; and
   a front guard provided forward of the operator seat, wherein
   the front guard includes:
      a first frame member provided forward of the operator seat and on the one side; and
      a second frame member provided forward of the operator seat and on another side opposite to the one side,
   the first frame member includes:
      a main rod portion defining upper and lower portions of the first frame member, extending between the upper and lower portions of the first frame member, and provided rearward of the front working device, and
   the main rod portion is formed to be positioned in a machine fore-and-aft direction closer to the operator seat than the second frame member.

2. The working machine according to claim 1, further comprising:
   a cabin including a front window defining a front surface of the cabin, wherein
   the front guard is provided forward of the cabin,
   the cabin includes:
      a first front pillar provided on one side of the front window; and
      a second front pillar provided on the other side of the front window, and
   the front guard includes:
      a first attaching stay provided on the first frame member and attached to the first front pillar;
      a second attaching stay provided on the second frame member and attached to the second front pillar;
      a third frame member joining an upper portion of the first frame member and an upper portion of the second frame member to each other; and
      a vibro-isolating member provided on the third frame member and pressed against an upper portion of the front window.

3. The working machine according to claim 2, further comprising:
   an attachment bracket fixed to the second front pillar by bolting, wherein
   the first attaching stay is formed of a single plate and includes:
      a base portion fixed to the first frame member by welding; and
      a fixture portion fixed to the first front pillar by bolting, and
   the second attaching stay is fixed to the attachment bracket by bolting.

4. The working machine according to claim 3, wherein the first attaching stay includes:
   an intermediate portion between the base portion and the fixture portion, and
   the intermediate portion includes:
      a first portion extending outward in the machine-width direction from the base portion; and
      a second portion extending slantwise upwardly or downwardly outward in the machine-width direction from the first portion.

5. The working machine according to claim 2, wherein the front window includes:
   a window frame defining a window opening, and
   the third frame member is positioned to overlap an upper edge of the window opening along a visual line from an operator.

6. The working machine according to claim 2, wherein the front window includes:
   a window frame defining a window opening; and
   a front surface panel covering the window opening,
   the front surface panel includes:
      an upper panel openably covering an upper area of the window opening;
      a lower panel fixedly fitted to the window frame to cover a lower area of the window opening; and
      a seal portion between the upper panel and the lower panel,
   the front guard includes:
      a fourth frame member joining a lower portion of the first frame member and a lower portion of the second frame member to each other, and
   the fourth frame member is positioned to overlap the seal portion along a visual line from an operator.

7. The working machine according to claim 6, wherein the front guard includes:
   a lattice portion between the first frame member and the second frame member, the lattice portion includes:
a plurality of vertical bars extending between the third frame member and the fourth frame member and aligned at intervals in the machine-width direction; and
a plurality of horizontal bars crossing the vertical bars and aligned vertically at intervals, and
an interval between the fourth frame member and the horizontal bar neighboring to the fourth frame member is wider than an interval between the third frame member and the horizontal bar neighboring to the third frame member.

8. The working machine according to claim 3, wherein the attachment bracket includes:
an attachment wall fixed to the second front pillar by bolting;
a placing wall extending forward from a lower portion of the attachment wall; and
a retaining wall extending upward from a front portion of the mounting wall, and
the second attaching stay is placed on the placing wall and is fixed to the placing wall by bolting.

9. A front guard attached to a working machine, the working machine including:
a machine body;
an operator seat mounted on the machine body; and
a front working device swingably upward and downward, the front working device being provided forward of the operator seat and on one side in a machine-width direction eccentric with respect to a central portion of the operator seat, wherein
the front guard is provided forward of the operator seat, the front guard comprises:
a first frame member provided at one width directional side of the front guard; and
a second frame member provided at the other width directional side of the front guard,
the first frame member includes:
a main rod portion defining upper and lower portions of the first frame member, extending between the upper and lower portions of the first frame member, and provided rearward of the front working device, and
the main rod portion is formed so that, in a state where the front guard is attached to the working machine, the main rod portion is positioned in a machine fore-and-aft direction closer to the operator seat than the second frame member.

10. The front guard according to claim 9, further comprising:
a first attaching stay provided on the first frame member and attached to the working machine;
a second attaching stay provided on the second frame member and attached to the working machine;
a third frame member joining an upper portion of the first frame member and an upper portion of the second frame member to each other, and
a vibro-isolating member provided on the third frame member and pressed against a portion of the working machine.

11. The front guard according to claim 10, further comprising:
an attachment bracket fixed to the second attaching stay by bolting and fixed to the working machine by bolting, wherein
the first attaching stay is formed of a single plate and includes:
a base portion fixed to the first frame member by welding; and
a fixture portion fixed to the working machine by bolting.

12. The front guard according to claim 11, wherein the first attaching stay includes:
an intermediate portion between the base portion and the fixture portion, and
the intermediate portion includes:
a first portion extending outward in the width direction from the base portion; and
a second portion extending slantwise outward in the width direction from the first portion along the extension direction of the first frame member.

13. The front guard according to claim 10, further comprising:
a fourth frame member joining a lower portion of the first frame member and a lower portion of the second frame member to each other; and
a lattice portion between the first frame member and the second frame member,
the lattice portion includes:
a plurality of vertical bars extending between the third frame member and the fourth frame member and aligned at intervals in the width direction; and
a plurality of horizontal bars crossing the vertical bars and aligned vertically at intervals, and
an interval between the fourth frame member and the horizontal bar neighboring to the fourth frame member is wider than an interval between the third frame member and the horizontal bar neighboring to the third frame member.

14. The front guard according to claim 11, wherein the attachment bracket includes:
an attachment wall fixed to the working machine by bolting;
a placing wall extending forward from a lower portion of the attachment wall; and
a retaining wall extending upward from a front portion of the placing wall, and
the second attaching stay is placed on the placing wall and is fixed to the placing wall by bolting.

* * * * *